INVENTORS
FAYETTE E. MARSH
CHARLES H. ANDERSEN
BY
ATTORNEY

Patented Nov. 19, 1935

2,021,191

UNITED STATES PATENT OFFICE 2,021,191

ARTICLE AND METHOD BY WHICH "BEN DAY" TONES ARE PHOTOGRAPHICALLY PRODUCED

Fayette E. Marsh and Charles H. Andersen, Los Angeles, Calif., assignors to Charles V. Price, Los Angeles, Calif.

Application July 5, 1933, Serial No. 679,012
Renewed April 16, 1935

6 Claims. (Cl. 95—5)

This invention relates to improvements in methods of preparing printing plates by the photo-engraving or lithographic process, with special regard to the means of introducing into the said plates shades or tones, generally known as "Ben Day" patterns.

It is well known in the engraving art, that "Ben Day" tones or shades may be introduced into the plates from which a printed image is produced by one of several methods which fall into two general classifications. By methods in the first of these classifications, the pattern is placed directly upon the plate in ink before it is etched, and by methods in the second classification the pattern is introduced into the camera copy and thereafter transferred to the plate as a component part of the image to be reproduced, by the means regularly employed in the art. The improved process, provided by this invention, falls within the latter classification and photographically produces a copy of the subject to be printed, into which copy has been introduced or added the desired tones or shades in "Ben Day" pattern. This copy containing the added shades or tones is then used as camera copy for reproduction of plates by the engraver.

This invention also relates to improvements in the method of photographically producing "Ben Day" tones, patented May 8, 1934, Patent #1,957,970; and carries forward some of the important steps outlined in the latter application.

We have discovered in the operation of the process described in the above patent, that by photographing different reflective coloring matters through a stencil in "Ben Day" or other pattern, there is produced on the camera film a negative image of the stencil, reduced or enlarged, in the areas colored, depending upon the light reflective value of the coloring matter being photographed.

For example, if the stencil used contains small round openings of a mesh of 60 to an inch, which openings make up 50% of the total area of the stencil, white reflective coloring matter will register on the film in the camera a pattern of black dots which are considerably larger than the openings in the stencil and green reflective coloring matter will register on the film a pattern of black dots which are considerably smaller than the openings in the stencil.

Upon the discovery and knowledge of the foregoing facts and their utilization are based the foundation of improvements which constitute the essence and upon which are founded the objects of the present invention.

Some of these objects are listed in the following order.

First, the invention contemplates the elimination of certain steps disclosed in the patent referred to supra, whereby the operation is simplified and the cost of manufacture is reduced.

Second, the comparative ease by which a multiplicity of graduated tones may be produced.

Third, it provides a means whereby plates can be remade, should the plates become damaged or broken.

Other objects, not listed, will be apparent when viewed in the light of the drawing and what is claimed; also how much of the cost of producing tones or shades on printing plates is eliminated and how the engraving art is greatly enriched by the ease and flexibility of its use, especially in the making of so-called "color plates".

With the use of the embodiment shown in the accompanying drawing, a method of using the improved process will now be illustrated.

A brief description of the figures in the drawing is:—

In the latter figure, the face of the stencil upon which the "Ben Day" pattern is imprinted, is shown nearest the observer and upon this face is shown various reflective matters where tones or shades are desired on a photo-copy of the master drawing.

Figure 4:
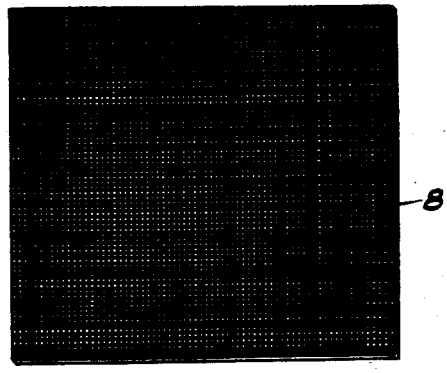

Fig. 4 represents the stencil or transparent overlay containing the "Ben Day" pattern referred to in the preceding paragraph.

Figure 3:
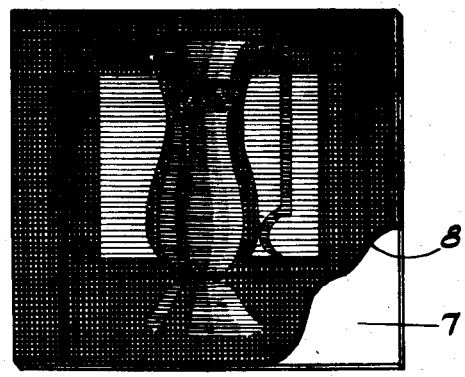
Fig. 3 represents a composite assembly of the negative placed upside down and a transparent overlay containing a "Ben Day" pattern, or stencil, there being a corner portion of the stencil broken away in order to show the blank or back side of the negative.
Figure 5:
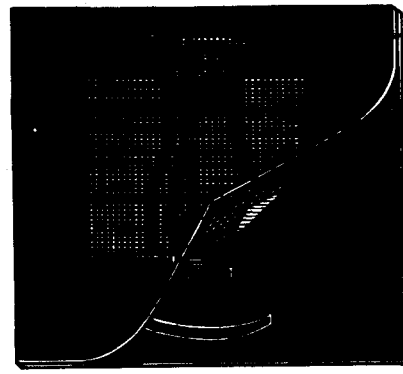

Fig. 5 represents a composite assembly of the negative and stencil shown in Fig. 3 in reversed positions. In the latter figure a corner portion of the stencil is rolled back in order to show the coloring matters on the under side thereof and also to show a position of the negative with which the colored areas are associated.

Figure 6:
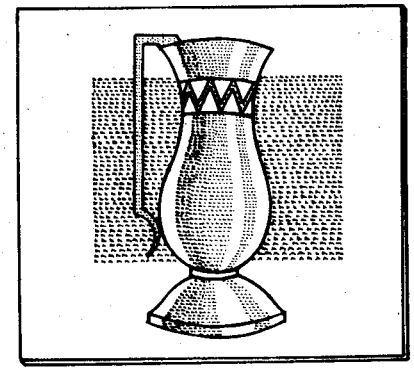

Fig. 6 represents a toned or shaded photographic reproduction of the master drawing.

The improved method of reproducing photographically a given subject, so as to include in the copy produced "Ben Day" tones or shades is as follows:—

Figure 1:
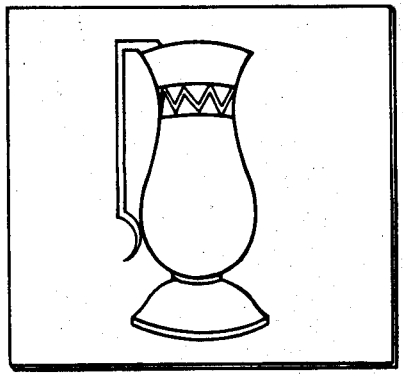
Fig. 1 represents the master drawing.

First, we provide a suitable subject to be shaded which in the present instance is termed a master drawing and represents a pitcher. Such a subject is shown in Fig. 1.

Figure 2:
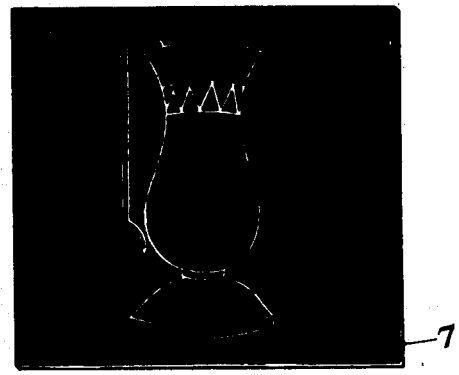
Fig. 2 represents a negative of the master drawing.

Next, we make a negative 7 of the master drawing. Such a negative is shown in Fig. 2. This negative must be on a white translucent support in order that the drawing serve as a guide for the application of colors on the transparency, described in the next step, as the transparency is placed on the reverse side of the negative.

Next, the negative is inverted and upon the back side thereof which is blank we superimpose a transparency or stencil 8 containing a "Ben Day" pattern. Such a stencil is separately shown in Fig. 4. The face of the transparency on which the "Ben Day" pattern is imprinted is placed nearest the observer or farthest away from the back or blank face of the negative. This composite assembly is then held toward the light so that the image on the negative appears in reverse thru the stencil and on the exposed face of the stencil, which is the side containing the imprinted design, is placed or laid various reflective coloring matters, having different reflective values, corresponding to the areas on which different values of the "Ben Day" pattern are to subsequently appear on the camera film when photographed. Such a composite assembly is shown in Fig. 3.

Pursuant to this plan we color that area white where we wish to produce on the corresponding area of the film in the camera, a dark "Ben Day" tone or shade, and that area blue-green where we wish to produce on the corresponding area of the film in the camera, a light "Ben Day" tone or shade.

Other areas, we color in intermediate tones of blue-green to white, where we wish to produce on the corresponding area of the film in the camera, intermediate "Ben Day" tones.

A similar arrangement of other reflective coloring matters having different reflective values may be utilized to produce like results and therefore can be used interchangeably.

Continuing the procedure of steps, already outlined, the composite assembly shown in Fig. 3 is then rearranged as shown in Fig. 5. This rearrangement consists in reversing the positions of both the negative and stencil from those shown in Fig. 3, so that the reflective coloring matter is now nearest or contiguous with the front face of the negative, the negative and stencil of course being placed in registry. The latter arrangement places the stencil of whatever design chosen, usually consisting of black opaque ink imprinted on a transparent support, between the reflective coloring matters and the camera.

Next, the reflective coloring matters are exposed to the camera film thru the openings of the stencil.

Lastly we remove the overlay and expose the negative alone and there is produced a toned or shaded subject, according to the value of the reflective coloring matter selected, as shown in Fig. 6.

This invention contemplates broadly the method of photographing various reflective coloring matters, having different reflective values, through a transparency on which has been imprinted, on one of the faces thereof, a "Ben Day" pattern.

It has been disclosed, step by step, by the method hereinbefore described. Whether the various reflective coloring matters are placed on the "Ben Day" stencil or on the master drawing, is considered patentably immaterial, so long as the stencil and the coloring matter is contiguous. This would be interpreted as meaning, placing the coloring matter on the transparency against the stencil design itself, as stated supra, or placing the various reflective coloring matters on a master drawing and then placing the imprinted side of the stencil against the coloring matter and photographing the combination.

We claim:

1. The method of producing "Ben Day" tones or shading effects, which consists in providing a master drawing, making a negative of the latter on a white translucent support, superimposing upon the reverse side of said negative a transparency containing a "Ben Day" pattern, the face of the transparency containing the pattern being placed nearest the operator, placing on the exposed face of the thus positioned transparency, in selected areas where tones or shades are to subsequently appear on a photo-copy of said drawing, various reflective coloring matters having different reflective values, reversing the registry positions of said negative and transparency and exposing the negative thru the stencil to a sensitized film, removing the transparency and then exposing the negative alone.

2. An article comprising a composite arrangement of a negative on a white translucent support, forming a background, and a transparency containing a pattern in "Ben Day", with the pattern side located next to the negative, through which said background is photographable, and suitable reflective coloring matters, having different reflective values, located over the "Ben Day" pattern on the pattern side of the transparency where gradations of tone of said pattern in "Ben Day" is to subsequently appear on photocopies made from the photographable assembly, whereby when the image of the whole is reproduced the pattern in "Ben Day" will appear in varying degree in the local areas colored according to the reflective value of the coloring matter used.

3. The method herein described, which consists in taking a master drawing and making a negative thereof on a white translucent support, placing various reflective coloring matters contiguous with the face of said negative and photographing the same through a transparency containing a "Ben Day" pattern, the pattern side of the transparency being placed contiguous with the face of said negative.

4. An article comprising a photographable composite arrangement of a negative on a white translucent support, a transparency containing a "Ben Day" pattern, the pattern side of said transparency being located next to the negative, and reflective coloring matters located over the "Ben Day" pattern on the pattern side of the transparency.

5. A photographable combination comprising a subject to be shaded, and a transparency or stencil containing a "Ben Day" pattern having reflective coloring matters located over the "Ben Day" pattern on the pattern side of the transparency and this side located next to the subject.

6. A photographable combination comprising a sheet containing a subject to be shaded, a transparency containing a "Ben Day" pattern with the pattern side located next to said sheet and reflective values placed contiguous with the abutting faces of said sheet and said transparency.

FAYETTE E. MARSH.
CHARLES H. ANDERSEN.